INVENTOR.
GARY D. FREDELL

United States Patent Office 3,422,941
Patented Jan. 21, 1969

3,422,941
ROTARY DRIVE STEPPER
Gary D. Fredell, East Moline, Ill., assignor to E. W. Bliss Company, Canton, Ohio, a corporation of Delaware
Filed July 6, 1967, Ser. No. 651,590
U.S. Cl. 192—12          11 Claims
Int. Cl. F16h 27/02; F16h 29/02; F16d 67/00

ABSTRACT OF THE DISCLOSURE

Stepped unidirectional rotary movement is converted from reciprocatory motion through using a shaft on which there is supported a one-way coupling connected to a housing rotatably supported on the shaft. Appropriate means reciprocate the housing to impart unidirectional drive to the shaft through the coupling. Ratchet means are secured to the shaft and locking pawls are driven into and out of locking engagement with the ratchet means in accordance with the operating cycle of the mechanism.

---

This invention relates to a drive mechanism and more particularly to a mechanism which converts reciprocatory motion into a stepped unidirectional rotary movement of a shaft.

Stepper mechanisms have been used for many years. These prior art mechanisms ordinarily have employed a ratchet wheel secured to the output shaft with a driving pawl reciprocated into engagement with the ratchet wheel to advance the wheel a predetermined amount with each reciprocation of the pawl. Although an arrangement such as this has been satisfactory when used in certain environments, problems are experienced in attempting to adapt this arrangement to an application in which either a high speed of operation or a high level of output torque is required. Moreover, the repeated engagement of the drive pawl with the ratchet wheel causes rapid wearing of both the pawl and the wheel thereby resulting in a relatively short life for the mechanisms. This is particularly so where either high speed or a high output torque is imposed on the mechanism. Another problem experienced by many prior art mechanisms of this type is the tendency of the shaft to over-rotate or get out of phase. Where an accurate, incremental movement is required, a condition such as that cannot be tolerated.

It is an object of this invention to provide an improved mechanism for converting reciprocatory motion into a stepped unidirectional rotary movement.

It is a further object of this invention to provide a stepper mechanism capable of operating at higher speeds and at higher torque levels than was heretofore obtainable with such mechanisms.

It is another object of this invention to provide a stepper mechanism in which the driving forces are distributed over a large surface area, thereby minimizing the wearing of the individual parts.

Another object of the invention is to provide a stepper mechanism which prevents mis-rotation of the shaft.

A further object of the invention is to provide a stepper mechanism which employs locking means operated by the actuating means to provide positive control of the shaft during all phases of the operating cycle.

It is a still further object of this invention to provide a stepper mechanism which employs a one-way coupling operatively connected to a shaft, with a ratchet wheel and lock pawls restricting movement of the shaft to a single direction.

More specifically, this invention contemplates a rotary stepper mechanism comprising a rotatable output shaft, a one-way coupling operatively engaged with the shaft, means for intermittently driving the one-way coupling and ratchet and pawl means operatively connected to the shaft to restrain rotation of the shaft to a single direction. The intermittent driving means includes means connected to the pawl means whereby the pawl is driven into and out of engagement with the ratchet wheel as the one-way coupling is operated.

Referring now to the drawings wherein like reference numerals indicate like parts in the various views.

Figure 1:
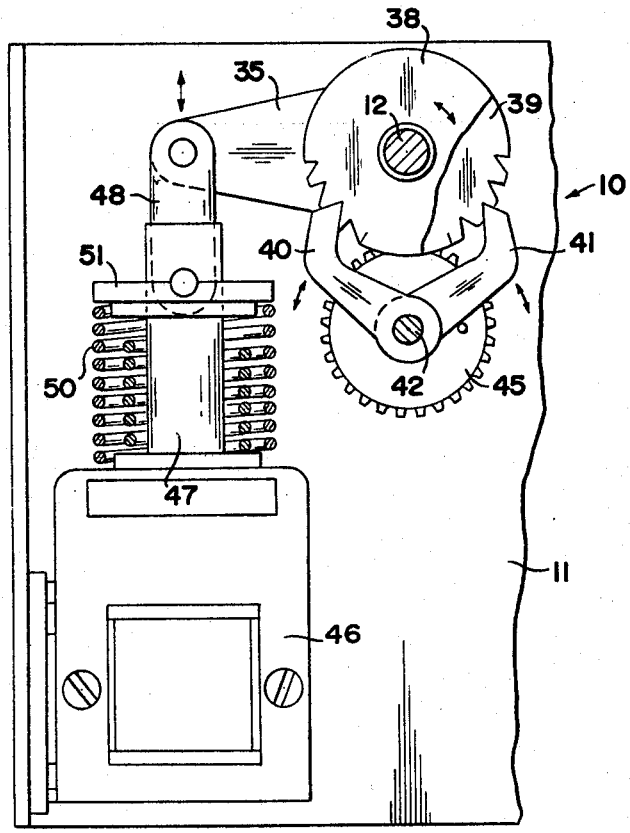
FIGURE 1 is an end elevation view of the mechanism comprising the instant invention.

Referring now to FIGURE 1, the rotary stepping mechanism comprising the instant invention is indicated generally by the reference numeral 10. This mechanism comprises a frame 11 on which there is supported a rotatable output shaft 12. It will be appreciated that the output shaft 12 may be employed to perform any external function which may required a stepped unidirectional rotary motion.

Figure 3:
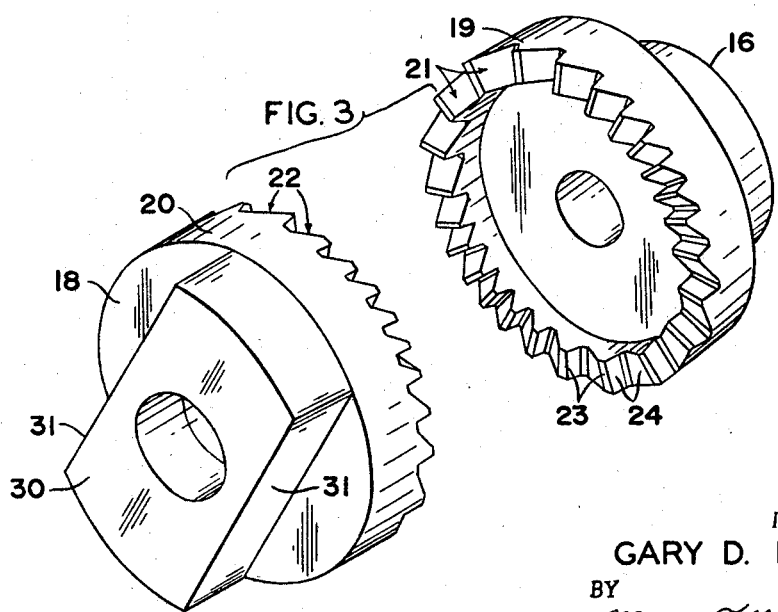
FIGURE 3 is a perspective view of the one-way coupling employed in the invention of FIGURE 1.
Figure 2:
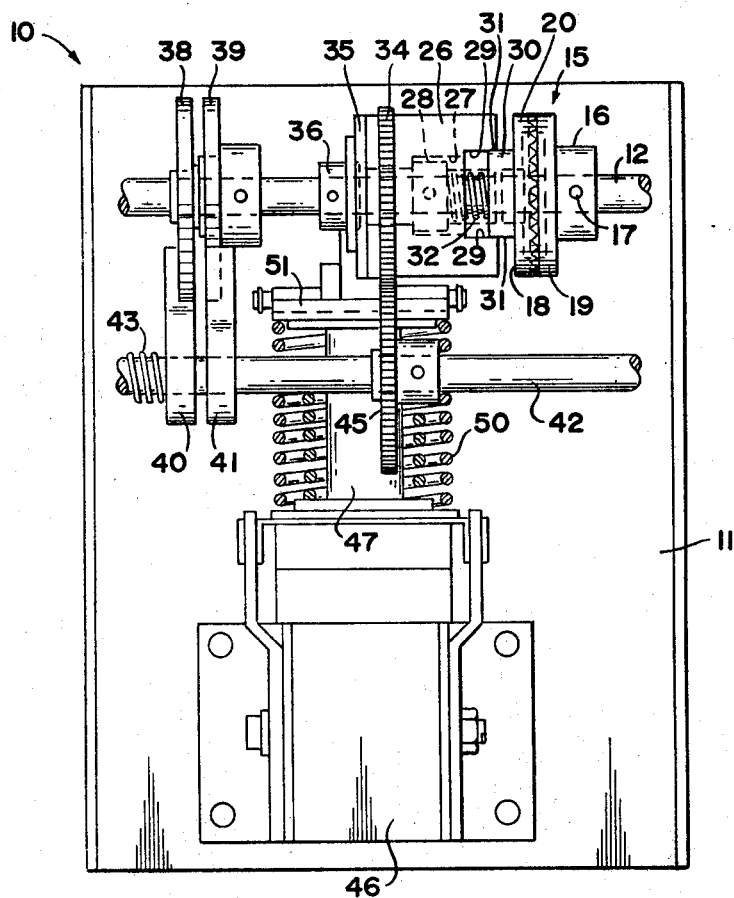
FIGURE 2 is a side elevation view of the mechanism of FIGURE 1.

As is more clearly apparent from FIGURES 2 and 3, a one-way coupling is employed to impart the unidirectional drive to the shaft 12. This one-way coupling, indicated generally by the reference numeral 15, comprises a driven member 16 through which shaft 12 extends and to which member 16 is secured as by pin means 17. The one-way coupling further includes a driving member 18, which is rotatably received over the shaft 12. The driving and driven members each include a coupling face 19 and 20, respectively. The coupling face 19 includes a plurality of axially extending teeth 21 and the coupling face 20 on the driving member 18 includes complementary teeth 22. It will be noted that the teeth 21 include a bevelled surface 23 and a flat surface 24. The teeth 22 are of a similar construction with the bevelled surfaces on the teeth of driving member 18 facing in the opposite direction to that of the bevelled surfaces on the teeth of driven member 16. It will be appreciated that the driving member 18 is designed to impart rotation to the driven member 16 in only one direction or, as viewed in FIGURE 3, in a clockwise direction. When the driving member 18 rotates in a counterclockwise direction, the respective bevelled faces of the teeth 21, 22 are in camming engagement and the driving member 18 is cammed axially away from the driven member 16.

Also rotatably supported on shaft 12 is a housing 26 which includes a counterbore 27. A collar 28 positioned in counterbore 27 is secured to the shaft 12 and positions the housing 26 a spaced distance from the driven member 16. The drive member 18 includes an axially projecting lug 30 extending from the rear face thereof. The lug includes opposed flats 31 which are adapted to engage similar flat surfaces 29 in the housing 26 thereby non-rotatably connecting member 18 to housing 26. However, it will be appreciated that member 18 may move axially relative to housing 26 through the sliding engagement of flats 29 and 31. A spring 32 is received in the passage 27 and is interposed between the collar 28 and the lug 30, thereby tending to bias the drive member 18 into engagement with the driven member 16. The housing 26 further includes an external gear 34 and a projecting arm 35, both of which are secured to the housing for movement therewith. A second collar 36 spaced from collar 28 is secured to the shaft 12 and prevents axial movement of housing 26 along the shaft 12 away from driven member 16.

Two ratchet wheels 38 and 39 are also secured to shaft 12 for rotation therewith. The wheels 38 and 39 are adapted to cooperate with pawls 40 and 41, respectively. The pawls 40 and 41 are supported on a shaft 42 which is rotatably carried in the frame 11. The pawl 40 is rotatable on shaft 42 and a spring 43 normally biases the pawl 40 into engagement with the teeth of the ratchet wheel 38. The pawl 41 is secured to the shaft 42 for rotation therewith. Ratchet wheel 38 carries teeth which cooperate with pawl 40 to prevent rotation of the wheel in the counterclockwise direction. In the clockwise direction of rotation, pawl 40 simply ratchets over the teeth on the wheel. The teeth on wheel 39 are oppositely directed to those on wheel 38 and cooperate with pawl 41 to prevent rotation of wheel 39 in the clockwise direction. A gear 45 is also secured to shaft 42 and is in meshing engagement with the gear 34 on the housing 26.

The frame 11 supports a solenoid 46 of a conventional construction. The solenoid includes a plunger or armature 47 which has secured at its upper end, a link 48 connected to the arm 35. Spring means 50 act against a collar 51 secured to the armature 47 to bias the armature to an extended position. It will be understood that energization of the solenoid 46 will result in the armature 47 being retracted and the spring 50 compressed. Deenergization of the solenoid 46 will permit the spring 50 to return the plunger 47 to the extended position.

The above described mechanism operates in the following manner:

Assuming the parts to be in the position illustrated in FIGURE 1, the solenoid 46 is energized causing the link 48 to pull arm 35 in the downward direction. Since the arm 35 is connected to the housing 26, a correspond- axis of the shaft 12 will result. Any tendency of the shaft 12 to rotate in the counterclockwise direction along with the housing 26 will be resisted through engagement to the pawl 40 with the ratchet wheel 38.

As the housing 26 is pivoted in the counterclockwise direction, so also the drive member 18 is pivoted in the same direction causing the bevelled surfaces on the meshing teeth 21, 22 to cam the drive member 18 longitudinally of the shaft 12 against the bias of the spring 32. Also simultaneous with the pivoting movement of the housing 26, the shaft 42 is rotated through meshing engagement of gear 34 with the gear 45 causing the pawl 41 to be pivoted out of engagement with the ratchet wheel 39.

It will be appreciated that the drive member 18, as it moves longitudinally of the shaft 12, continues to be under the bias of the spring 32 so that as the teeth 22 on member 18 slide up the bevelled surface 23 on the teeth of driven member 16, the spring 32 is operative to bias the drive member back into a position of driving engagement with the driven member immediately thereafter. The stroke of the armature 47 is selected so that the drive member 18 moves counterclockwise an amount equal to one tooth or such other increment of movement as may be desired.

As the armature 47 reaches the bottom of its stroke, the condition of the various elements is such that the drive member 18 has been biased back into meshing engagement with the driven member 16 and the pawl 41 is spaced from the teeth of ratchet wheel 39 with the pawl 40 remaining in resilient engagement with the ratchet wheel 38. The solenoid 46 is then de-energized permitting the spring 50 to return the armature to its extended position. In so doing, the arm 35 pivots the housing 26 in a clockwise direction. Drive member 18 is carried with housing 26 and imparts a corresponding rotation to the driven member 16 and the shaft 12. The pawl 40, which is resiliently biased by spring 43, cams over the ratchet teeth on ratchet wheel 38. As these various movements are occurred, the pawl 41 is being driven back into engagement with the ratchet wheel 39 through the meshing engagement of gears 34 and 45. The various parts are so interrelated that, as the armature 47 reaches the top of its stroke, the pawl 41 comes into engagement with the teeth of ratchet wheel 39. The engagement of pawl 41 with the ratchet wheel 39 effectively locks the shaft 12 against further movement in the drive direction. A stop formed in the solenoid 46 or a part of frame 11 restrains further movement of armature 47 in the extended direction.

It will be appreciated that the above-described operation has imparted to the shaft 12 a stepped unidirectional rotary motion. When the operation has been completed, the shaft 12 is locked in position through the engagement of pawl 40 with ratchet wheel 38 which prevents counterclockwise rotation of shaft 12 and through the engagement of pawl 41 with ratchet wheel 39 which prevents rotation of shaft 12 in the clockwise direction. Only through operation of the solenoid 46 which in turn drives the pawl 41 out of engagement with the ratchet wheel 39 may the shaft 12 then be driven in the clockwise direction.

It will be appreciated that the above-described mechanism accomplishes the objects set forth hereinabove. Thus, a carefully controlled unidirectional movement of shaft 12 is obtained. Through utilization of a one-way coupling such as that described, the driving forces imparted to the shaft are distributed over a large surface area. As a result, a substantially higher level of torque may be transmitted than was possible with the prior art mechanisms. Moreover, due to the relatively large surface area over which the forces are distributed, wear in the mating parts is substantially reduced. In addition, any wear in the meshing teeth 21, 22 is automatically compensated for by the spring 32 which maintains the driven member in engagement with the driving member at all times. It will also be appreciated that the mechanism may be operated at significantly higher speeds since the driving and driven members 18, 16 are always in a position of engagement and the pawl 41 is positively controlled in its movements toward and away from the ratchet wheel 39.

Having thus described my invention, I claim:

1. A drive mechanism comprising:
   an output shaft rotatably mounted in a frame;
   a one-way coupling operatively connected to said shaft for imparting rotation in one direction;
   actuating means operatively connected to said coupling for imparting a predetermined rotation thereto;
   lock means operatively connected to said shaft for restraining rotation of said shaft; and
   said lock means being effective to prevent rotation of said shaft in one direction and limiting the amount of rotation of said shaft in the other direction.

2. The mechanism of claim 1, wherein said one-way coupling comprises a driven member secured to said shaft for rotation therewith;
   a driving member rotatably supported on said shaft adjacent said driven member;
   said driving and driven members having interengaging teeth formed thereon; and
   said teeth having bevelled surfaces on one side thereof and flat surfaces on the other side thereof with the bevelled surfaces on said teeth on said driven member facing in a direction opposite to the bevelled surfaces on said teeth on said driving member whereby said driving member imparts rotation to said driven member in only one direction of rotation.

3. The mechanism of claim 2, wherein said operative connection between said actuating means and said coupling comprises a housing rotatable on said shaft;
   means securing said driving member for rotation with said housing but permitting movement of said driving member axially of said shaft towards and away from said driven member;
   means biasing said driving member toward said driven member; and
   said actuating means including an arm carried by said housing.

4. The mechanism of claim 3, wherein said lock means includes ratchet means secured to said shaft;

pawl means pivotally supported on the frame; and means interconnecting said housing with said pawl means whereby rotation of said housing in one direction pivots said pawl means away from said ratchet means and rotation of said housing in the other direction pivots said pawl means into engagement with said ratchet means.

5. The mechanism of claim 4 and further including additional ratchet means secured to said shaft;

second pawl means pivotally supported on the frame; and means biasing said second pawl means into engagement with said additional ratchet means whereby said second pawl means prevents rotation of said shaft in one direction.

6. The mechanism of claim 4, wherein said means interconnecting said housing with said pawl means comprises:

a gear on said housing;

a shaft connected to said pawl means; and gear means on said shaft in engagement with said gear means on said housing.

7. The mechanism of claim 1, wherein said lock means includes ratchet means secured to said shaft;

pawl means pivotally supported on the frame; and means interconnecting said actuating means with said pawl means whereby the movement of said pawl means toward and away from said ratchet means is controlled by said actuating means.

8. The mechanism of claim 7 and further including additional ratchet means secured to said shaft;

second pawl means pivotally supported on the frame; and means biasing said second pawl means into engagement with said additional ratchet means whereby said second pawl means prevents rotation of said shaft in one direction.

9. The mechanism of claim 7, wherein said coupling comprises a driven member secured to said shaft for rotation therewith;

a driving member rotatably supported on said shaft; and means operatively interconnecting said actuating means with said driving member.

10. The mechanism of claim 7, wherein said means interconnecting said pawl means with said actuating means comprises a housing rotatably supported on said output shaft;

gear means on said housing;

means interconnectinng said housing with said actuating means;

a second shaft secured to said pawl means; and gear means on said second shaft in meshing engagement with said gear means on said housing.

11. The mechanism of claim 10, wherein said coupling comprises a driven member secured to said output shaft for rotation therewith;

a driving member rotatably supported on said output shaft;

means securing said driving member for rotation with said housing but permitting movement of said driving member towards and away from said driven member.

References Cited

UNITED STATES PATENTS

| 1,719,613 | 7/1929 | Kohler | 192—12 |
| 1,985,406 | 12/1934 | Galkin | 192—12 |

MILTON KAUFMAN, *Primary Examiner.*

U.S. Cl. X.R.

74—88, 126